(12) United States Patent
Li (10) Patent No.: US 11,310,558 B2
(45) Date of Patent: Apr. 19, 2022

(54) BUFFER PROCESSING METHOD, APPARATUS, DEVICE AND COMPUTER STORAGE MEDIUM

(71) Applicant: BEIJING BAIDU NETCOM SCIENCE AND TECHNOLOGY CO., LTD., Beijing (CN)

(72) Inventor: Yongxing Li, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/911,777

(22) Filed: Jun. 25, 2020

(65) Prior Publication Data

US 2021/0021895 A1  Jan. 21, 2021

(30) Foreign Application Priority Data

Jul. 17, 2019 (CN) .......................... 201910646664.8

(51) Int. Cl.
*H04N 21/234* (2011.01)
*H04N 21/24* (2011.01)
*H04N 21/2662* (2011.01)
*H04N 21/4402* (2011.01)
(Continued)

(52) U.S. Cl.
CPC . *H04N 21/44004* (2013.01); *H04N 21/23406* (2013.01); *H04N 21/2401* (2013.01); *H04N 21/2662* (2013.01); *H04N 21/44227* (2013.01); *H04N 21/440281* (2013.01)

(58) Field of Classification Search
CPC ....... H04N 21/44004; H04N 21/23406; H04N 21/2401; H04N 21/2662; H04N 21/440281; H04N 21/44227
See application file for complete search history.

(56) References Cited

U.S. PATENT DOCUMENTS

| 9,042,261 B2* | 5/2015 | Lundin | H04L 43/0852 370/252 |
| 9,106,787 B1* | 8/2015 | Holmer | H04L 47/2416 |
| 10,921,801 B2* | 2/2021 | Celia | G05B 19/4185 |

(Continued)

FOREIGN PATENT DOCUMENTS

| CA | 2742447 A1 * | 5/2010 | .......... H04N 19/115 |
| CN | 101340358 A | 1/2009 | |

(Continued)

OTHER PUBLICATIONS

Extended European Search Report dated Sep. 17, 2020 for related European Appln. No. 20183901.6; 12 Pages.

*Primary Examiner* — James R Sheleheda (74) *Attorney, Agent, or Firm* — Brooks Kushman P.C.

(57) ABSTRACT

The present disclosure provides a buffer processing method, apparatus, device and computer storage medium, where the method comprises: if it is detected that a drop of an available bandwidth of a receiving terminal exceeds a preset first threshold, detecting whether a drop of a video frame rate of the receiving terminal exceeds a preset second threshold, the second threshold being smaller than the first threshold; if YES, adjusting a buffer size of the receiving terminal; and if NO, keeping the buffer size of the receiving terminal unchanged. The manner provided by the present disclosure can optimize the buffer of the receiving terminal and reduce the delay.

9 Claims, 3 Drawing Sheets

(51) Int. Cl.
*H04N 21/442* (2011.01)
*H04N 21/44* (2011.01)

(56) References Cited

U.S. PATENT DOCUMENTS

| | | | |
|---|---|---|---|
| 10,924,347 B1* | 2/2021 | Narsian | H04L 41/0853 |
| 2007/0036180 A1 | 2/2007 | Shenoi | |
| 2008/0109865 A1* | 5/2008 | Su | H04N 21/2401 |
| | | | 725/116 |
| 2008/0112320 A1* | 5/2008 | van Willigenburg | |
| | | | H04L 43/0882 |
| | | | 370/235 |
| 2010/0185748 A1* | 7/2010 | Ishii | H04N 21/236 |
| | | | 709/219 |
| 2011/0066673 A1* | 3/2011 | Outlaw | H04L 65/4092 |
| | | | 709/203 |
| 2012/0106669 A1* | 5/2012 | Rao | H04N 19/149 |
| | | | 375/295 |
| 2012/0179834 A1* | 7/2012 | van der Schaar | H04N 19/187 |
| | | | 709/231 |
| 2012/0281572 A1* | 11/2012 | Lundin | H04L 43/106 |
| | | | 370/252 |
| 2013/0034012 A1* | 2/2013 | Oshiba | H04L 43/10 |
| | | | 370/252 |
| 2014/0244857 A1* | 8/2014 | Hahm | H04N 21/4331 |
| | | | 709/231 |
| 2015/0109909 A1* | 4/2015 | Yeddala | H04W 28/0215 |
| | | | 370/230 |
| 2015/0249845 A1* | 9/2015 | Tirosh | H04N 21/2408 |
| | | | 725/62 |
| 2016/0037128 A1* | 2/2016 | Van der Auwera | |
| | | | H04L 43/0852 |
| | | | 348/14.13 |
| 2020/0029110 A1* | 1/2020 | Xin | H04L 12/40065 |

FOREIGN PATENT DOCUMENTS

| | | | | |
|---|---|---|---|---|
| CN | 103051955 A | * | 4/2013 | |
| CN | 103259803 A | * | 8/2013 | H04L 65/80 |
| CN | 103533451 A | * | 1/2014 | |
| CN | 107113283 A | * | 8/2017 | H04L 1/1835 |
| CN | 108781139 A | * | 11/2018 | H04L 1/1877 |
| CN | 109327716 A | * | 2/2019 | |
| CN | 109327716 A | | 2/2019 | |
| JP | 2005322995 A | | 11/2005 | |
| JP | 2008199361 A | | 8/2008 | |
| JP | 2009077108 A | | 4/2009 | |
| KR | 20100078470 A | | 7/2010 | |
| KR | 101017352 B1 | | 2/2011 | |
| KR | 20120113601 A | | 10/2012 | |
| KR | 101818577 B1 | | 1/2018 | |
| KR | 20190013868 A | | 2/2019 | |
| KR | 20190043868 A | | 4/2019 | |

* cited by examiner

BUFFER PROCESSING METHOD, APPARATUS, DEVICE AND COMPUTER STORAGE MEDIUM

CROSS-REFERENCE TO RELATED APPLICATIONS

The present application claims the priority of Chinese Patent Application No. 2019106466648, filed on Jul. 17, 2019, with the title of "Buffer processing method, apparatus, device and computer storage medium". The disclosure of the above applications is incorporated herein by reference in its entirety.

TECHNICAL FIELD

The present disclosure relates to technical field of multimedia play, and particularly to a buffer processing method, apparatus, device and computer storage medium.

BACKGROUND

This portion aims to provide a background or context for embodiments of the present disclosure as stated in the claim set. The depictions here are not considered as the prior art as being included in this portion.

When a receiving terminal plays multimedia such as audio or video, a frame of complete data received will be directly played with an excellent effect if the network is ideal, i.e., without packet loss and jitters and with a low delay. However, an actual network is usually complicated, and jam might be caused if the multimedia is still directly played in this way. Therefore, the receiving terminal will use a jitterbuffer to buffer the received data frame, and then obtain the data frame from the jitterbuffer for decoding and playing.

The buffer is performed at the price of a delay. The larger the delay is, a better effect of suppressing the jitters is achieved. However, a larger delay causes an undesirable playing experience to the user. Hence, a balance is usually achieved by dynamically adjusting a buffer size. Currently, a manner of dynamically adjusting the buffer size mainly depends on adjustment of the real-time network bandwidth, and the buffer size is in a negatively correlated relationship with the real-time network bandwidth. For example, when the network bandwidth increases, the buffer decreases; when the network bandwidth reduces, the buffer increases. However, in some cases, although the network bandwidth reduces, the actual network bandwidth is still higher than a video code rate, and the video can still be played smoothly without increasing the buffer. It can be seen that the current manner of dynamically adjusting the buffer size causes the unreasonable delay.

SUMMARY

In view of the above, the present disclosure provides a buffer processing method, apparatus, device and computer storage medium, to facilitate optimizing the buffer of the receiving terminal and reducing the delay.

Specific technical solutions are as follows: in a first aspect, the present disclosure provides a buffer processing method, comprising: if it is detected that a drop of an available bandwidth of a receiving terminal exceeds a preset first threshold, detecting whether a drop of a video frame rate of the receiving terminal exceeds a preset second threshold, the second threshold being smaller than the first threshold; if yes, adjusting a buffer size of the receiving terminal; if no, keeping the buffer size of the receiving terminal unchanged.

According to a preferred embodiment of the present disclosure, the available bandwidth of the receiving terminal is determined according to a time when the receiving terminal receives each data frame and a size of the data frame.

According to a preferred embodiment of the present disclosure, the second threshold is smaller than or equal to one half of the first threshold.

According to a preferred embodiment of the present disclosure, the second threshold is 10%, and the first threshold is 20%.

According to a preferred embodiment of the present disclosure, the adjusting a buffer size of the receiving terminal comprises: adjusting the buffer size of the receiving terminal according to the available bandwidth of the receiving terminal, where the buffer size is negatively correlated with the available bandwidth of the receiving terminal.

According to a preferred embodiment of the present disclosure, the adjusting the buffer size of the receiving terminal according to the available bandwidth of the receiving terminal comprises: determining a maximum value and an average value of the data frame received by the receiving terminal within a preset time window, and determining a noise delay; estimating a value of a desired buffer size using the available bandwidth of the receiving terminal, the maximum value, the average value and the noise delay; adjusting the buffer size of the receiving terminal to the estimated value.

According to a preferred embodiment of the present disclosure, the determining the noise delay comprises: predicting the noise delay after performing Kalman filtering for the noise already received by the receiving terminal.

In a second aspect, the present disclosure provides a buffer processing apparatus, comprising: a detection unit configured to, if it is detected that a drop of an available bandwidth of a receiving terminal exceeds a preset first threshold, detect whether a drop of a video frame rate of the receiving terminal exceeds a preset second threshold, the second threshold being smaller than the first threshold; a buffer adjusting unit configured to, if the detection unit detects that the drop of the video frame rate of the receiving terminal exceeds the preset second threshold, adjust a buffer size of the receiving terminal; otherwise, keep the buffer size of the receiving terminal unchanged.

According to a preferred embodiment of the present disclosure, the apparatus further comprises: a bandwidth determining unit configured to determine the available bandwidth of the receiving terminal according to a time when the receiving terminal receives each data frame and a size of the data frame.

According to a preferred embodiment of the present disclosure, the second threshold is 10%, and the first threshold is 20%.

According to a preferred embodiment of the present disclosure, the buffer adjusting unit is specifically configured to adjust the buffer size of the receiving terminal according to the available bandwidth of the receiving terminal, where the buffer size is negatively correlated with the available bandwidth of the receiving terminal.

According to a preferred embodiment of the present disclosure, the buffer adjusting unit is specifically configured to: determine a maximum value and an average value of the data frame received by the receiving terminal within a preset time window, and determine a noise delay; estimate a value of a desired buffer size using the available bandwidth of the receiving terminal, the maximum value, the average value and the noise delay; adjusting the buffer size of the receiving terminal to the estimated value.

In a third aspect, the present disclosure provides a device, comprising: one or more processors, a storage for storing one or more programs, the one or more programs, when executed by said one or more processors, enable said one or more processors to implement the above method.

In a fourth aspect, the present disclosure further provides a storage medium containing computer executable instructions which, when executed by a computer processor, perform the above method.

As can be seen from the above technical solutions, the manner provided by the present disclosure considers the drop of the available bandwidth of the receiving terminal, and further considers the drop of the data frame rate of the receiving terminal. Only when the drop of the data frame rate is larger is the buffer adjusted, thereby optimizing the buffer of the receiving terminal and reducing the delay.

DETAILED DESCRIPTION

The present disclosure will be described in detail with reference to figures and specific embodiments to make objectives, technical solutions and advantages of the present disclosure more apparent.

The adjustment of the buffer size for the receiving terminal in the prior art only considers the impact of the available bandwidth and does not consider the actual reception situation of the multimedia data frame by the receiving terminal, so that the adjustment of the buffer size according to the available bandwidth is inaccurate and causes a larger delay in some cases. Hence, upon deciding whether to adjust the buffer size, the present disclosure not only considers the available bandwidth of the receiving terminal but also considers the actual reception situation of the multimedia data frame by the receiving terminal. Detailed depictions will be presented in conjunction with embodiments.

Figure 1:
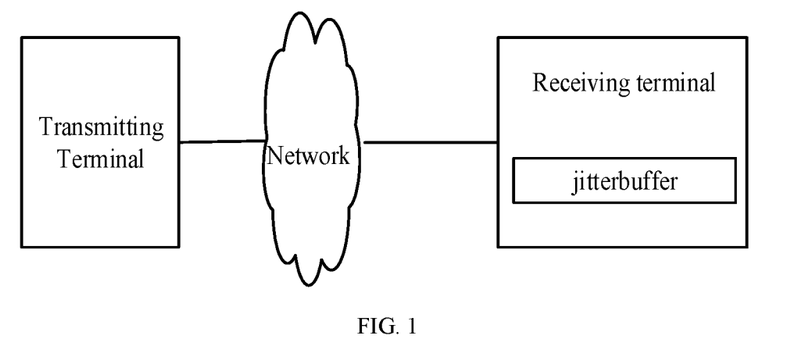
FIG. 1 is a schematic diagram of a main system architecture that is applied by embodiments of the present disclosure.

FIG. 1 is a schematic diagram of a main system architecture that is applied by embodiments of the present disclosure. As shown in FIG. 1, the system includes a transmitting terminal and a receiving terminal. The transmitting terminal is a device for transmitting a media stream and responsible for encoding and transmitting the multimedia data. The receiving terminal is a device for receiving the media stream and usually responsible for buffering, decoding and playing the multimedia data frames. The method and apparatus involved by the present invention are mainly implemented at the side of the receiving terminal.

The transmitting terminal and receiving terminal may perform transmission of the media streams over a network, and may be connected in various types such as a wired or wireless communication link or an optical fiber cable.

The buffer employed at the receiving terminal in the embodiment of the present disclosure may be a jitterbuffer or a buffer in other forms. The jitterbuffer is taken as an example in subsequent embodiments for illustration. In addition, the multimedia data frame involved in embodiments of the present disclosure may be video frame, audio frame, image frame etc. The video frame is taken as an example in subsequent embodiments for illustration.

Figure 2:
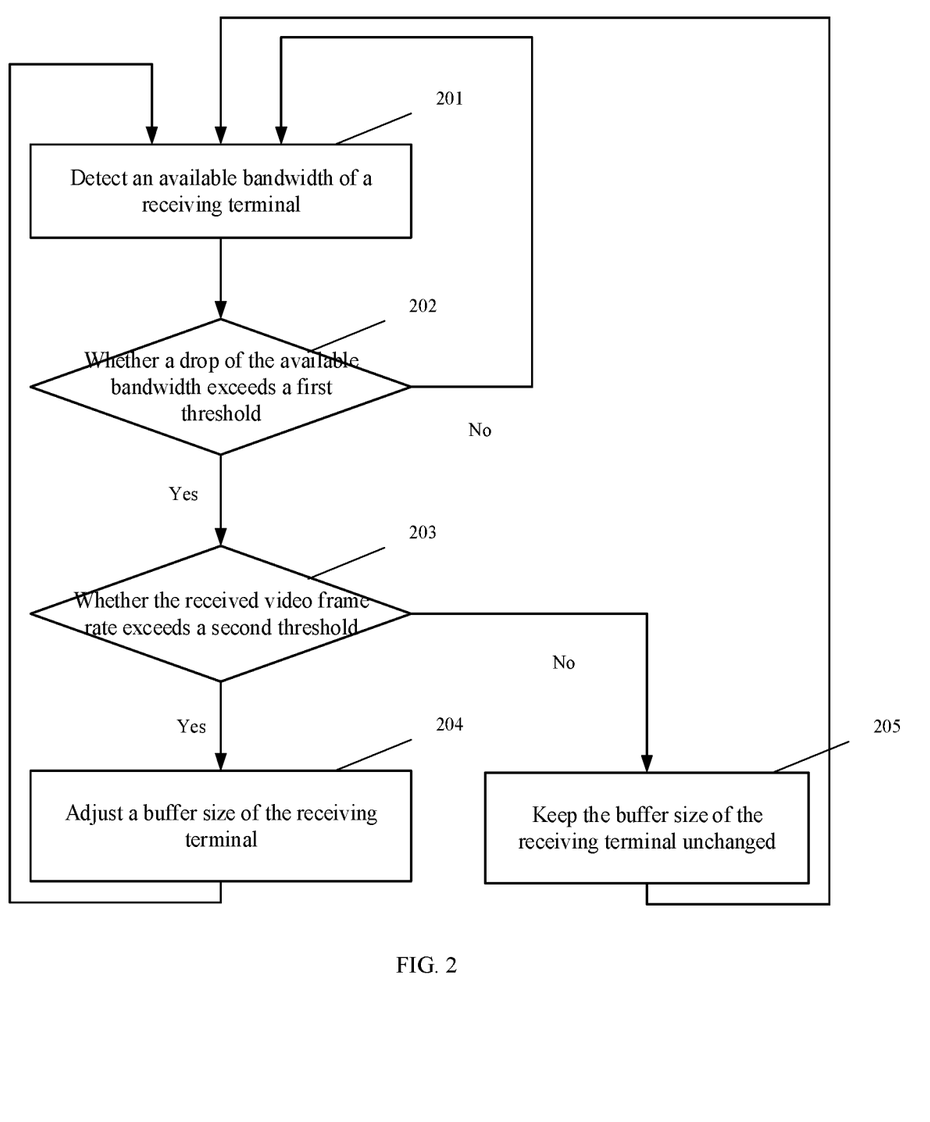
FIG. 2 is a flow chart of a main method according to an embodiment of the present disclosure.

FIG. 2 is a flow chart of a main method according to an embodiment of the present disclosure. The method may be performed by a buffer processing device disposed at the receiving terminal. The device may be an application at the receiving terminal, or may further be a function unit such as a plug-in or a Software Development Kit (SDK) in an application located at the receiving terminal. As shown in FIG. 2, the method mainly includes the following steps:

At 201, an available bandwidth of the receiving terminal is detected.

In this step, detection of the available bandwidth of the receiving terminal may be performed regularly, or performed in real time (e.g., the detection of the bandwidth is performed whenever a data frame is received), or performed triggered by a specific event. This is not particularly limited in the present disclosure.

The available bandwidth of the receiving terminal is estimated according to the time when the receiving terminal receives each data frame and the size of the data frame, for example, according to a ratio of the size of the data frame to the time when the data frame is received. In the embodiment of the present disclosure, the available bandwidth of the receiving terminal is represented as bwe in the measure unit bps (bits per second).

At 202, judge whether the received available bandwidth of the receiving terminal exceeds a preset first threshold, and perform 203 if yes, otherwise, turn back to 201 to detect the available bandwidth.

At 203, detect whether a drop of a video frame rate received at the receiving terminal exceeds a preset second threshold, and perform 204 if yes; otherwise, perform 205.

Usually, the buffer size needs to be adjusted only when the available bandwidth drops substantially, to avoid causing play jam at the receiving terminal. In the embodiment of the present disclosure, detection is performed according to whether the drop of the available bandwidth of the receiving terminal exceeds the preset first threshold. The drop here refers to an amplitude of a drop and is usually represented with a percentage.

When the drop of the available bandwidth received at the receiving terminal exceeds the preset first threshold, since the available bandwidth of the receiving terminal is estimated using the received video frame and does not certainly really reflect the reception of the video at the receiving terminal, the drop of the video frame rate of the receiving terminal is further detected. The drop here is also represented with a percentage.

The second threshold is smaller than the first threshold, and the values may employ an experimental value, an empirical value etc. As a preferred embodiment, the second threshold may be smaller than or equal to one half of the first threshold. For example, the first threshold may take 20% and the second threshold may take 10%.

At 204, adjust the buffer size of the receiving terminal, and after completion of adjustment this time, turn back to step 201 to detect the available bandwidth.

The buffer size of the receiving terminal may be adjusted in many ways. One of the ways is adjusting the buffer size of the receiving terminal according to the available bandwidth of the receiving terminal, wherein the buffer size is negatively correlated with the available bandwidth of the receiving terminal.

Specifically, after the available bandwidth of the receiving terminal is estimated, a maximum value (represented as maxFrameSize) and an average value (represented as avgFrameSize) of the data frame received by the receiving terminal within a preset time window are determined, and a noise delay (represented as varNoise) is determined.

When the varNoise is determined, the noise delay is predicted after Kalman filtering is performed for the noise already received by the receiving terminal.

Then, a value jitterDelay of the needed buffer size is estimated using the available bandwidth bwe of the receiving terminal, the maximum value maxFrameSize), the average value avgFrameSize and the noise delay varNoise.

For example, the following equation may be used:

$$\text{jitterDelay} = \frac{1}{bwe} \times (\text{maxFrameSize} - \text{avgFrameSize}) + \text{varNoise} \quad (1)$$

where the jitterDelay comprises two portions, namely, a delay caused by transmission of a large data frame and a delay caused by network noise.

The delay caused by transmission of a large data frame is embodied as $$\frac{1}{bwe} \times (\text{maxFrameSize} - \text{avgFrameSize}),$$

and the delay caused by network noise is: varNoise.

The varNoise may employ a conventional calculation manner. The following manner is presented as an example:

$$\text{varNoise} = \text{alpha} \ast \text{varNoise} + (1-\text{alpha}) \ast (d\_dT - \_\text{avgNoise}) \ast (d\_dT - \text{avgNoise}) \quad (2)$$

$$\text{where avgNoise} = \text{alpha} \ast \text{avgNoise} + (1-\text{alpha}) \ast d\_dT \quad (3)$$

It can be seen that the values of varNoise and avgNoise are updated as above to obtain updated values of varNoise and avgNoise.

Alpha is a probability coefficient and affected by a frame rate. When the frame rate becomes lower, the value of alpha becomes smaller, and this indicates that the current noise becomes larger. avgNoise is the average noise of received historical data frames, and d_dT is a difference between an actual value and a predicted value of the frame delay.

It needs to be appreciated that the present disclosure is not limited to above specific equations provided by embodiments of the present disclosure, and variations and extension made on the basis of the principles reflected by the above equations all fall within the protection scope of the present disclosure.

Finally, the buffer size of the receiving terminal is adjusted to the estimated value jitterDelay, and upon complete of the adjustment of the jitterbuffer this time, the process will turn back to step 201 to detect the available bandwidth.

In addition to the above manner of determining the jitterDelay in the above example, other manners may also be employed and not exhausted any more here.

At 205, keep the buffer size of the receiving terminal unchanged, and turn back to step 201 to detect the available bandwidth.

If the video frame rate of the receiving terminal does not drop substantially, this indicates that the reception of the video frame by the receiving terminal is stall excellent, and smooth play of the video frame can be ensured. The size of the jitterBuffer needn't be increased according to the available bandwidth of the receiving terminal, so that the delay in playing the video frame is reduced as compared with the prior art.

In addition, the following explanation is presented based on the above embodiment: the available bandwidth is a value predicted according to the time of each data frame and the size of the data frame, and the data frame rate is a real value. The actual available bandwidth and the data frame rate are both affected by many factors, the reduction of the predicted available bandwidth does not necessarily cause the reduction of the data frame rate, and the reduction of the data frame rate is a result. Therefore, if the judgement is made directly based on the drop of the data frame rate, the adjustment of the buffer size will be made lag behind. Judging first based on the drop of the available bandwidth and then based on the drop of the data frame rate according to the above embodiment of the present disclosure can effectively reduce the lag in the adjustment of the buffer size.

Figure 3:
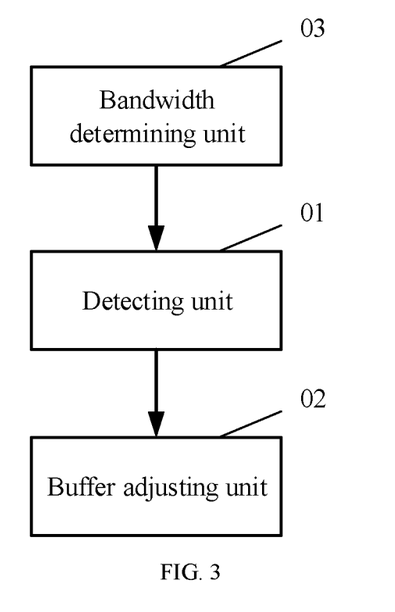
FIG. 3 is a structural diagram of an apparatus according to an embodiment of the present disclosure.

The method according to embodiments of the present disclosure is described above in detail, and the apparatus according to the present disclosure will be described below in detail in conjunction with an embodiment. FIG. 3 is a structural diagram of an apparatus according to an embodiment of the present disclosure. As shown in FIG. 3, the apparatus may comprise: a detection unit 01 and a buffer adjusting unit 02, and may further comprise a bandwidth determining unit 03. Main functions of the units are as follows:

The detection unit 01 is configured to detect an available bandwidth of a receiving terminal, and if it is detected that a drop of the available bandwidth of the receiving terminal exceeds a preset first threshold, detect whether a drop of a video frame rate of the receiving terminal exceeds a preset second threshold, the second threshold being smaller than the first threshold.

The buffer adjusting unit 02 is configured to adjust a buffer size of the receiving terminal if the detection unit 01 detects that the drop of the video frame rate of the receiving terminal exceeds the preset second threshold; otherwise, keep the buffer size of the receiving terminal unchanged.

The bandwidth determining unit 03 is configured to determine the available bandwidth of the receiving terminal according to a time when the receiving terminal receives each data frame and a size of the data frame.

The first threshold and second threshold may take an experimental value or an empirical value. As a preferred embodiment, the second threshold may be one half of the first threshold. For example, the second threshold takes 10%, and the first threshold takes 20%.

The buffer adjusting unit 02 may adjust the buffer size of the receiving terminal according to the available bandwidth of the receiving terminal, wherein the buffer size is negatively correlated with the available bandwidth of the receiving terminal.

Specifically, the buffer adjusting unit 02 may determine a maximum value and an average value of the data frame received by the receiving terminal within a preset time window, and determine a noise delay; then estimate a value of the desired buffer size using the available bandwidth of the receiving terminal, the maximum value, the average value and the noise delay; and then adjust the buffer size of the receiving terminal to the estimated value.

The buffer adjusting unit 02 may predict the noise delay after performing Kalman filtering for the noise already received by the receiving terminal.

The estimation of the value of the buffer size and the prediction of the noise delay may be performed by using the Equation (1) and Equation (2) in the method embodiments, but not limited to the two specific equations, and variations and extension made on the basis of the principles reflected by the equations all fall within the protection scope of the present disclosure.

Figure 4:
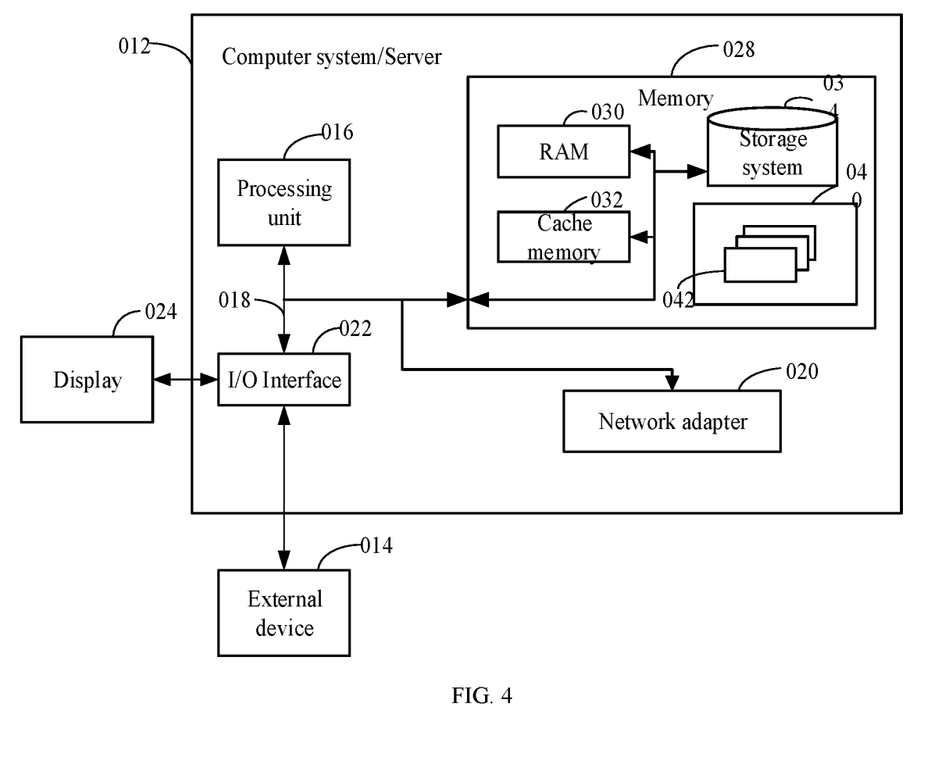
FIG. 4 is a block diagram of an exemplary computer system/server adapted to implement embodiments of the present disclosure.

FIG. 4 illustrates a block diagram of an example computer system/server adapted to implement an implementation mode of the present disclosure. The computer system/server 012 shown in FIG. 4 is only an example and should not bring about any limitation to the function and scope of use of the embodiments of the present disclosure.

As shown in FIG. 4, the computer system/server 012 is shown in the form of a general-purpose computing device. The components of the computer system/server 012 may include, but are not limited to, one or more processors or processing units 016, a system memory 028, and a bus 018 that couples various system components including system memory 028 and the processor 016.

The bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by the computer system/server 012, and it includes both volatile and non-volatile media, removable and non-removable media.

The system memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more application programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 may communicate with an external radar device, with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 4, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the system memory 028, for example, implement the steps of the method according to embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the one or more processors perform the steps of the method according to embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A buffer processing method, wherein the method comprises:
    determining an amplitude of a drop of an available bandwidth of a receiving terminal, and comparing the determined amplitude of the drop of the available bandwidth to a preset first threshold,
    if the determined amplitude of the drop of the available bandwidth exceeds the preset first threshold, determining an amplitude of a drop of a video frame rate of the receiving terminal, and comparing the determined amplitude of the drop of the video frame rate to a preset second threshold, the second threshold being smaller than the first threshold, wherein the available bandwidth of the receiving terminal is determined according to a time when the receiving terminal receives a data frame and a size of the data frame;
    if the amplitude of the drop of the video frame rate of the receiving terminal exceeds the preset second threshold, adjusting a buffer size of the receiving terminal; and
    if the amplitude of the drop of the video frame rate of the receiving terminal does not exceed the preset second threshold, keeping the buffer size of the receiving terminal unchanged,
    wherein the adjusting a buffer size of the receiving terminal comprises:
    adjusting the buffer size of the receiving terminal according to the available bandwidth of the receiving terminal, where the buffer size is negatively correlated with the available bandwidth of the receiving terminal, and
    wherein the adjusting the buffer size of the receiving terminal according to the available bandwidth of the receiving terminal comprises:
    determining a maximum and average frame size of data frames received by the receiving terminal within a preset time window, and determining a noise delay after performing Kalman filtering for the noise already received by the receiving terminal;
    estimating a value of a desired buffer size using the available bandwidth of the receiving terminal, the maximum value, the average value and the noise delay; and
    adjusting the buffer size of the receiving terminal to the estimated value.

2. The method according to claim 1, wherein the second threshold is smaller than or equal to one half of the first threshold.

3. The method according to claim 2, wherein the second threshold is 10%, and the first threshold is 20%.

4. A device, wherein the device comprises:
    one or more processors;
    a storage for storing one or more programs,
    the one or more programs, when executed by said one or more processors, enable said one or more processors to implement a buffer processing method, wherein the method comprises:
    determining an amplitude of a drop of an available bandwidth of a receiving terminal, and comparing the determined amplitude of the drop of the available bandwidth to a preset first threshold,
    if the determined amplitude of the drop of the available bandwidth exceeds the preset first threshold, determining an amplitude of a drop of a video frame rate of the receiving terminal, and comparing the determined amplitude of the drop of the video frame rate to a preset second threshold, the second threshold being smaller than the first threshold, wherein the available bandwidth of the receiving terminal is determined according to a time when the receiving terminal receives a data frame and a size of the data frame;
    if the amplitude of the drop of the video frame rate of the receiving terminal exceeds the preset second threshold, adjusting a buffer size of the receiving terminal; and
    if the amplitude of the drop of the video frame rate of the receiving terminal does not exceed the preset second threshold, keeping the buffer size of the receiving terminal unchanged,
    wherein the adjusting a buffer size of the receiving terminal comprises:
    adjusting the buffer size of the receiving terminal according to the available bandwidth of the receiving terminal, where the buffer size is negatively correlated with the available bandwidth of the receiving terminal, and
    wherein the adjusting the buffer size of the receiving terminal according to the available bandwidth of the receiving terminal comprises:
    determining a maximum and average frame size of data frames received by the receiving terminal within a preset time window, and determining a noise delay after performing Kalman filtering for the noise already received by the receiving terminal;
    estimating a value of a desired buffer size using the available bandwidth of the receiving terminal, the maximum value, the average value and the noise delay; and
    adjusting the buffer size of the receiving terminal to the estimated value.

5. The device according to claim 4, wherein the second threshold is smaller than or equal to one half of the first threshold.

6. The device according to claim 5, wherein the second threshold is 10%, and the first threshold is 20%.

7. A non-transitory storage medium containing computer executable instructions which, when executed by a computer processor, perform a buffer processing method, wherein the method comprises:

determining an amplitude of a drop of an available bandwidth of a receiving terminal, and comparing the determined amplitude of the drop of the available bandwidth to a preset first threshold, if the determined amplitude of the drop of the available bandwidth exceeds the preset first threshold, determining an amplitude of a drop of a video frame rate of the receiving terminal, and comparing the determined amplitude of the drop of the video frame rate to a preset second threshold, the second threshold being smaller than the first threshold, wherein the available bandwidth of the receiving terminal is determined according to a time when the receiving terminal receives a data frame and a size of the data frame;

if the amplitude of the drop of the video frame rate of the receiving terminal exceeds the preset second threshold, adjusting a buffer size of the receiving terminal; and if the amplitude of the drop of the video frame rate of the receiving terminal does not exceed the preset second threshold, keeping the buffer size of the receiving terminal unchanged, wherein the adjusting a buffer size of the receiving terminal comprises:

adjusting the buffer size of the receiving terminal according to the available bandwidth of the receiving terminal, where the buffer size is negatively correlated with the available bandwidth of the receiving terminal, and wherein the adjusting the buffer size of the receiving terminal according to the available bandwidth of the receiving terminal comprises:

determining a maximum and average frame size of data frames received by the receiving terminal within a preset time window, and determining a noise delay after performing Kalman filtering for the noise already received by the receiving terminal;

estimating a value of a desired buffer size using the available bandwidth of the receiving terminal, the maximum value, the average value and the noise delay; and adjusting the buffer size of the receiving terminal to the estimated value.

8. The non-transitory storage medium according to claim 7, wherein the second threshold is smaller than or equal to one half of the first threshold.

9. The non-transitory storage medium according to claim 8, wherein the second threshold is 10%, and the first threshold is 20%.

* * * * *